United States Patent [19]

Konno

[11] Patent Number: 5,342,001
[45] Date of Patent: Aug. 30, 1994

[54] TAPE CASSETTE HAVING A REEL-LOCKING OR LID-LOCKING DEVICE

[75] Inventor: Toshikazu Konno, Miyagi, Japan

[73] Assignee: Sony Corporation, Japan

[21] Appl. No.: 16,564

[22] Filed: Feb. 11, 1993

[30] Foreign Application Priority Data

Feb. 28, 1992 [JP] Japan ............... 4-079368

[51] Int. Cl.$^5$ ........................... G11B 23/087
[52] U.S. Cl. ............... 242/338.3; 242/343.2; 242/347.1
[58] Field of Search ............ 242/198, 199, 200; 360/132

[56] References Cited

U.S. PATENT DOCUMENTS

| | | | |
|---|---|---|---|
| 4,004,752 | 1/1977 | Kamaya | 242/198 |
| 4,136,843 | 1/1979 | Gourley | 242/198 |
| 4,232,840 | 11/1980 | Sugawara | 242/198 |
| 4,945,127 | 7/1990 | Kagawa et al. | 524/524 |
| 5,189,110 | 2/1993 | Ikematu et al. | 525/314 |

FOREIGN PATENT DOCUMENTS 62-190980 12/1987 Japan.

Primary Examiner—Daniel P. Stodola
Assistant Examiner—John Q. Nguyen
Attorney, Agent, or Firm—Ronald P. Kananen

[57] ABSTRACT

A tape cassette includes a cassette casing which rotatably accommodates tape reels for winding a tape and accommodates a reel locking member for preventing the rotation of the reel when the tape cassette is not in use, wherein the reel locking member is unitedly formed with a spring portion for spring-biasing the reel locking member in its locking direction that the reel locking member prevents the rotation of the reels, and wherein the reel locking member is made of shape memory resin.

10 Claims, 6 Drawing Sheets

TAPE CASSETTE HAVING A REEL-LOCKING OR LID-LOCKING DEVICE

BACKGROUND OF THE INVENTION

1. Field of the Invention

The present invention generally relates to tape cassettes and, more particularly, is directed to a tape cassette having a reel locking member for preventing the rotation of a tape reel or locking the tape reel when the cassette is not in use, and having a locking member for locking when the cassette is not in use a guard panel which opens and closes a tape exposing portion provided at a front face of the tape cassette.

2. Description of the Prior Art

The structure of an example of conventional tape cassettes for a video tape recorder (VTR) will be explained with reference to FIGS. 1 to 5B.

Referring to FIGS. 1 to 5B, a cassette casing 2 of a tape cassette 1 is formed by fixedly integrating an upper half 3 and a lower half 4. A pair of tape reels for winding a tape (magnetic tape) T, that is, a supply reel 5 and a take-up reel 6 are rotatably accommodated in the cassette casing 2. The tape T extended from the supply reel 5 is exposed at a tape exposing portion 8 which is provided at a front face of the cassette casing 2 through tape guides 7a and 7b, and then wound by the take-up reel 6 through tape guides 9a and 9b.

A guard panel 11 is provided at the front face of the cassette casing 2 in order to protect the tape T exposed at the front face. The guard panel 11 has side panels 11a provided at both sides thereof which are pivotally supported by the cassette casing 2 so that the guard panel 11 is swingable upwardly and downwardly. When the cassette is not in use or is not mounted in a VTR, the guard panel 11 is located at a position shown in FIG. 1 to close the tape exposing portion 8 so as to protect the tape T. When the tape cassette 1 is mounted in the VTR, the guard panel 11 is rotated upward by a mechanism of the VTR to expose the tape exposing portion 8.

A reel locking mechanism 12 is provided within the cassette casing 2 at its rear center portion so as to prevent the rotation of or lock both the reels 5 and 6 to thereby prevent the tape from unwinding when the tape cassette 1 is not in use. The reel locking mechanism 12 has a pair of reel locking members 13 and 14 disposed in association with the supply reel 5 and the take-up reel 6, respectively, and an operating member 15 for pressing the reel locking members 13 and 14. The reel locking members 13 and 14 are pivotally supported by pivots 16 and 17 which are implanted upwardly on the lower half 4 of the cassette casing 2. The reel locking members 13 and 14 have engaging ratchets 13a and 14a for engaging respectively with teeth 5a and 6a formed on the outer peripheries of the reels 5 and 6 and operating rods 13b and 14b which abut against the operating member 15. The engaging ratchets 13a and 14a and the operating rods 13b and 14b are integrally formed.

A pin 18 is projected upwardly from the lower half 4 at an intermediate position between the reel locking members 13 and 14, and a torsion coil spring 19 made from stainless material is wound around the pin 18. Opposite arm portions of the torsion coil spring 19 engage with engaging projections 20 and 21 formed on the reel locking members 13 and 14, respectively. Thus, the reel locking members 13 and 14 are rotatably biased by the torsion coil spring 19 to swing in such directions that the engaging ratchets 13a and 14a engage respectively with the tooth 5a and 6a of the reels 5 and 6 as shown in FIG. 4A. Accordingly, each of the reels 5 and 6 is prevented from rotating to thereby prevent the tape from unwinding.

When the tape cassette 1 is mounted or inserted in the VTR, a releasing member (not shown) provided in the VTR comes into the tape cassette 1 through a through hole 22 of the lower half 4 to push the operating member 15, so that the operating member 15 presses the operating rods 13b and 14b of the reel locking members 13 and 14. Thus, the reel locking members 13 and 14 swing against the spring-biasing force of the torsion coil spring 19 in such directions that the engaging ratchets 13a and 14a disengaged from the teeth 5a and 6a of the reels 5 and 6 so that each of the reels 5 and 6 is unlocked and becomes rotatable as shown in FIG. 4B.

A guard panel locking mechanism 23 is provided within the cassette casing 2 at its front corner portion so as to hold the guard panel 11 in a closed state when the tape cassette 1 is not in use as shown in FIG. 5A and 5B. The guard panel locking mechanism 23 mainly comprises by a guard panel locking member 25 which is pivotally supported by a pivot 24 projected upwardly from the lower half 4 of the cassette casing 2. The guard panel locking member 25 has an engaging ratchet 25a and an operating projection 25b which are united together. The engaging ratchet 25a and the operating projection 25b are arranged so as to protrude out of the cassette casing 2 through through-holes 26a and 26b formed through a side panel 4a of the lower half 4. An engaging recess 27 is formed on an inner side of a side panel 11a of the guard panel 11 in correspondence with the engaging ratchet 25a of the guard panel locking member 25.

A torsion coil spring 28 is wound around the pivot 24 by which the guard panel locking member 25 is pivotally supported. One arm portion of the torsion coil spring 28 engages with an engaging projection 29 of the guard panel locking member 25 and the other arm portion of thereof engages with an engaging projection 30 provided on the inner side of the side panel of the lower half 4. Thus, the guard panel locking member 25 is always biased by the torsion coil spring 28 to swing in such a direction that the engaging ratchet 25a and the operating projection 25b protrude out of the side panel of the lower half respectively through the through-holes 26a and 26b.

When the guard panel 11 is closed, the engaging recess 27 of the side panel 11a thereof engages with the engaging ratchet 25a of the guard panel locking member 25, so that the guard panel 11 is locked such that it cannot swing open, as shown in FIG. 5A. When the tape cassette 1 is loaded onto the VTR, a releasing member (not shown) of the VTR comes into the tape cassette 1 to push the operating projection 25b of the guard panel locking member 25. Thus, the guard panel locking member 25 swings inward or counterclockwise in FIG. 5A against the spring-biasing force of the torsion coil spring 28 so that the engaging rachet 25a goes out of the engaging recess 27. Hence, the guard panel 11 is released from the locked state and becomes rotatable, as shown in FIG. 5B.

Recently, in order to reduce cost and improve productivity in making the above-described tape cassette, spring or elastic portions such as plastic springs have been unitarily formed as biasing means with the reel locking members 13, 14 and the guard panel locking member 25 to thereby eliminate the torsion coil springs 19 and 28. However, this has resulted in the position that the spring portions are deformed due to creep load applied thereto in the VTR. That is, when the tape cassette is inserted in the VTR, the reel locking members 13, 14 and the guard panel locking member 25 are placed in such states that the reels 5, 6 and the guard panel 11 are released from the locked states, respectively, so that a creep load is kept applied to each of the spring portions. Since, in general, temperature within the VTR is high, the plastic is likely deformed. Thus, if the spring portions are kept biased by the creep load for a long period of time in the VTR, the spring portions are deformed to such a degree that they do not act as springs and can not recover their original configurations. As a result, each of the reels 5, 6 and the guard panel 11 can not be locked reliably after the tape cassette is ejected from the VTR.

OBJECTS AND SUMMARY OF THE INVENTION

It is an object of the present invention to provide an improved tape cassette in which the aforementioned shortcomings and disadvantages encountered with the prior art can be eliminated.

More specifically, it is an object of the present invention to provide a tape cassette in which each of the reel locking members and the guard panel locking member is not deformed by the creep load applied thereto even if the tape cassette is kept to be inserted in a VTR for a long period of time.

As an aspect of the present invention, a tape cassette includes a cassette casing which rotatably accommodates tape reels for winding a tape and accommodates a reel locking member for preventing the rotation of the reel when the tape cassette is not used, wherein the reel locking member is unitedly formed with a spring portion for spring-biasing the reel locking member in its locking direction that the reel locking member prevents the rotation of the reel, and wherein the reel locking member is made of shape memory resin.

As another aspect of the present invention, a tape cassette includes a guard panel for opening and closing a tape exposing portion provided at a front face of a cassette casing and a guard panel locking member for holding the guard panel in a closed state when the tape cassette is not used, wherein the guard panel locking member is unitedly formed with a spring portion for spring-biasing the guard panel locking member in its locking direction that the guard panel locking member holds the guard panel in the closed state, and wherein the guard panel locking member is made of shape memory resin.

According to the thus constituted tape cassette of the present invention, even if the spring portions of the reel locking member and the guard panel locking member are deformed due to the creep load applied thereto, the spring portions recover their original configurations by suitably setting a shape recovery temperature of the shape memory resin constituting the spring portions. Thus, the spring portions do not deform and so both the reels and the guard panel can be reliably held in the locked and closed states by the reel locking member and the guard panel locking member when the tape cassette is ejected from the VTR.

The preceding and other objects, features, and advantages of the present invention will become apparent from the following detailed description of an illustrative embodiment thereof when read in conjunction with the accompanying drawings, in which like reference numerals are used to identify the same or similar parts in the several views.

DETAILED DESCRIPTION OF THE PREFERRED EMBODIMENT

A tape cassette according to the embodiment of the present invention will now be described with reference to FIGS. 6A to 7B, in which case, the present invention is applied to a tape cassette for use in a VTR as an example. In the figures, portions identical to those of FIGS. 1 to 5B are referred to by the same references, with explanation thereof being omitted.

Figure 1:
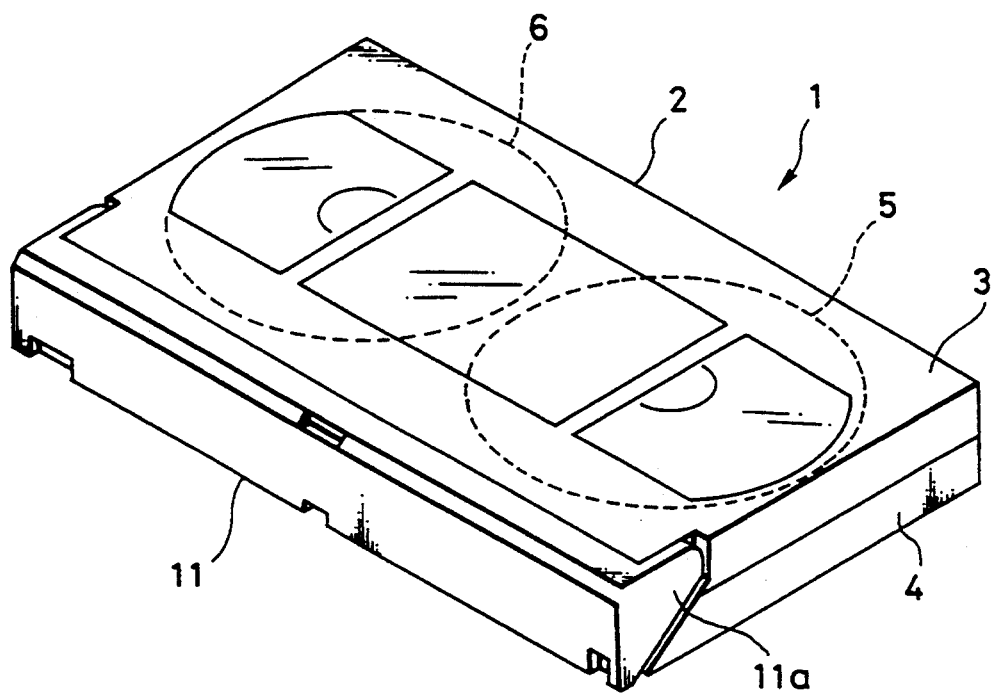
FIG. 1 is a schematic perspective view illustrating a tape cassette for a VTR.
Figure 2A:
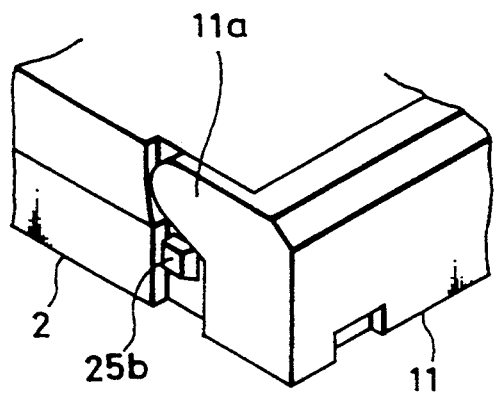
FIG. 2A is a schematic perspective view illustrating a part of the tape cassette in which a guard panel thereof is closed.
Figure 2B:
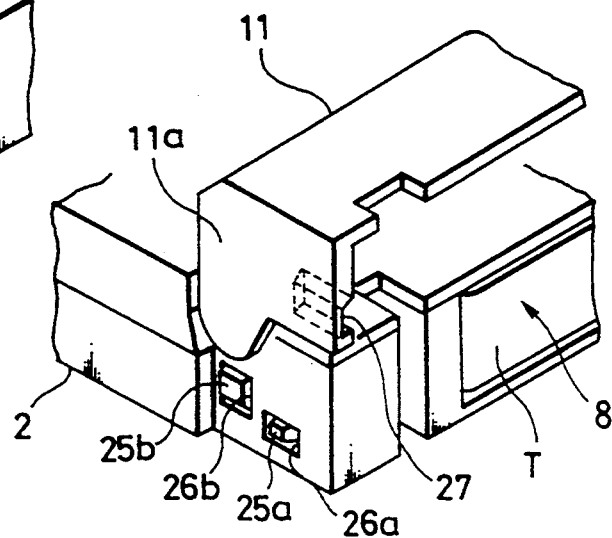
FIG. 2B is a schematic perspective view illustrating the part of the tape cassette in which the guard panel thereof is opened.
Figure 3:
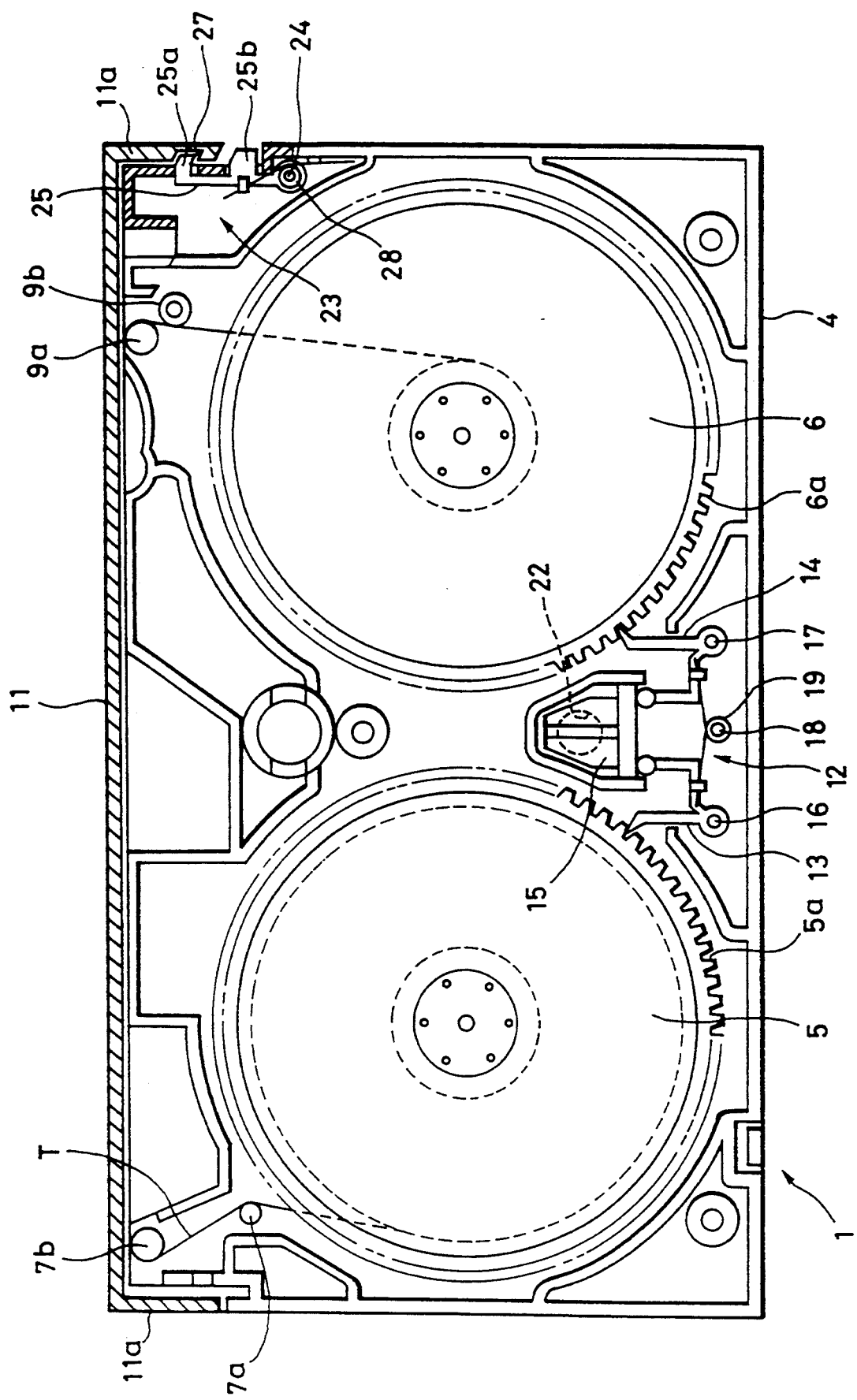
FIG. 3 is a schematic plan view illustrating an example of the conventional tape cassettes in which an upper half thereof is taken out.
Figure 4A:
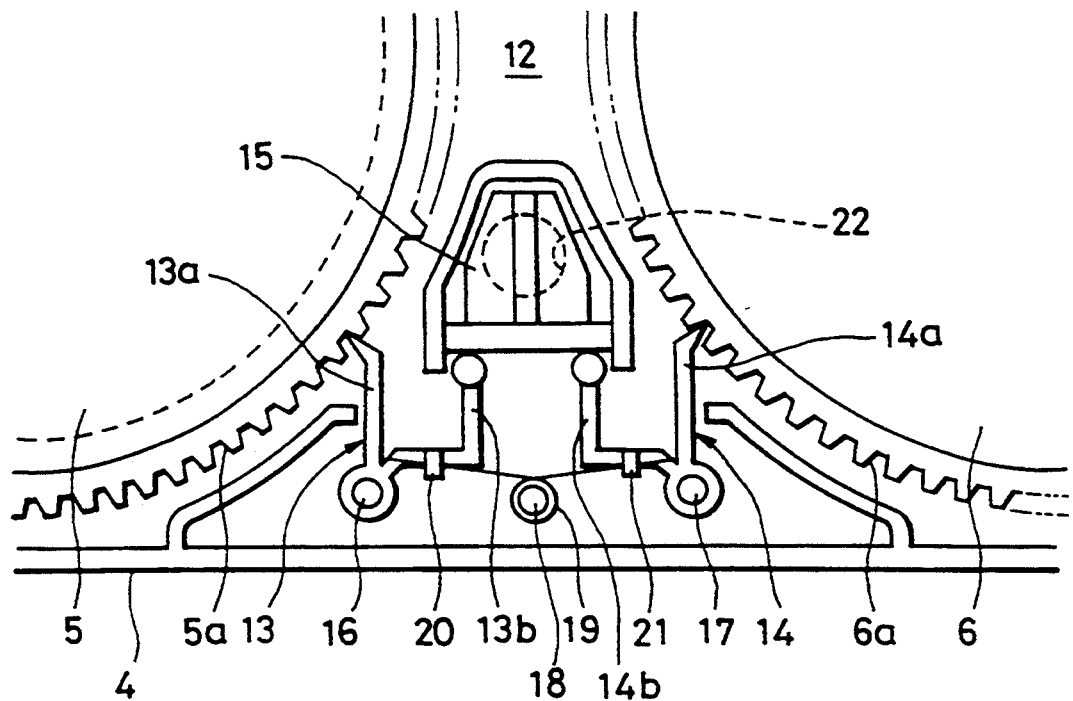
FIG. 4A is a schematic plan view illustrating a reel locking mechanism of the conventional tape cassette in which tape reels are in locked states.
Figure 4B:
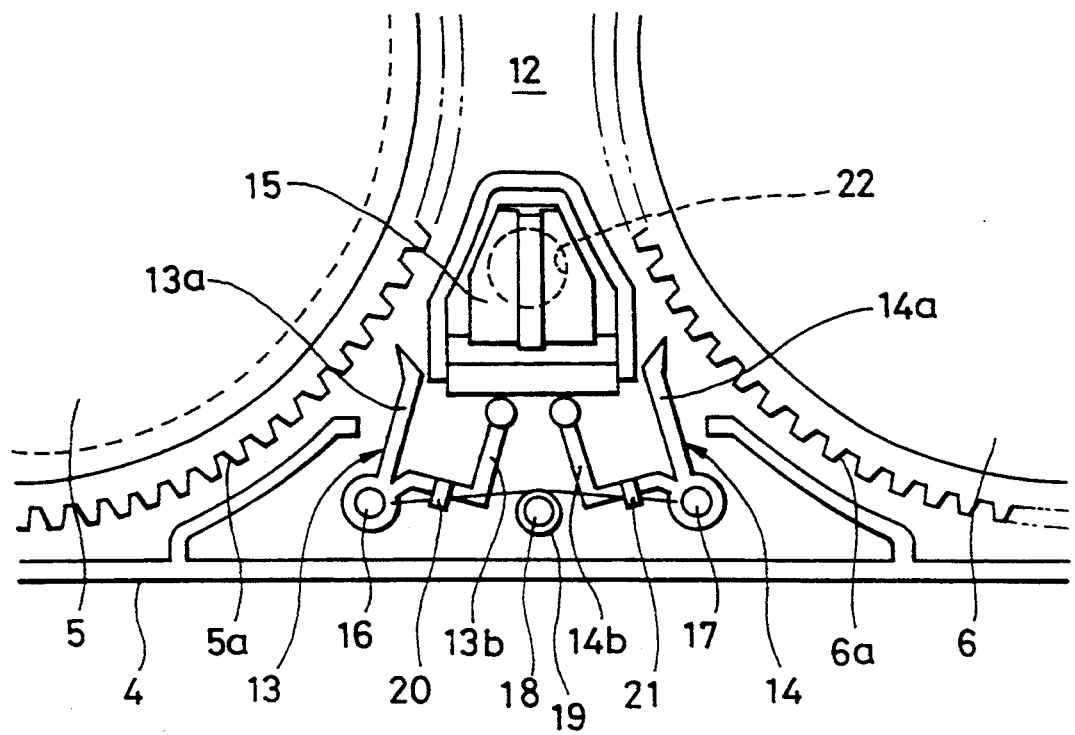
FIG. 4B is a schematic plan view illustrating the reel locking mechanism of the conventional tape cassette in which the tape reels are released from the locked states.
Figure 5A:
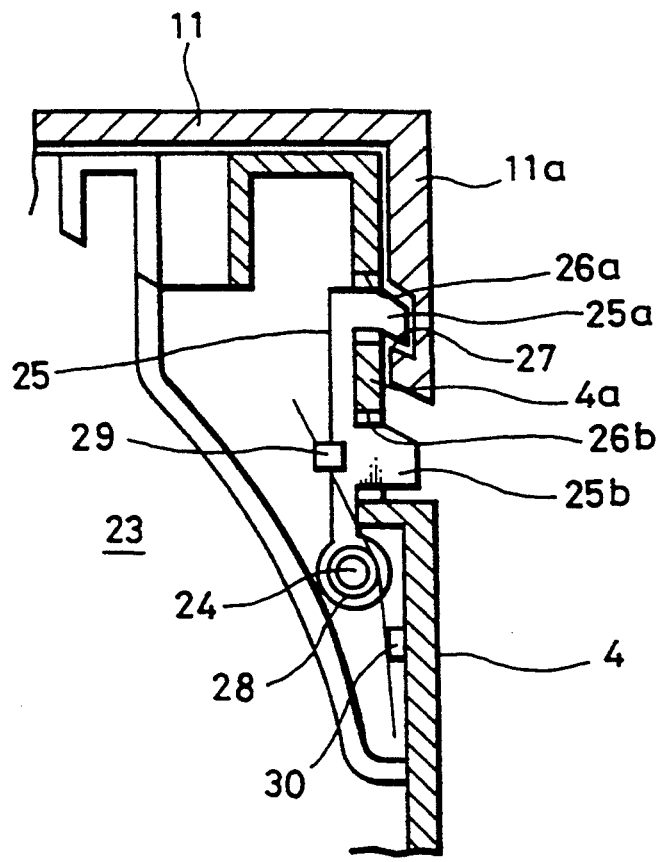
FIG. 5A is a schematic plan view illustrating a guard panel locking mechanism of the conventional tape cassette in which a guard panel is in a locked state.
Figure 5B:
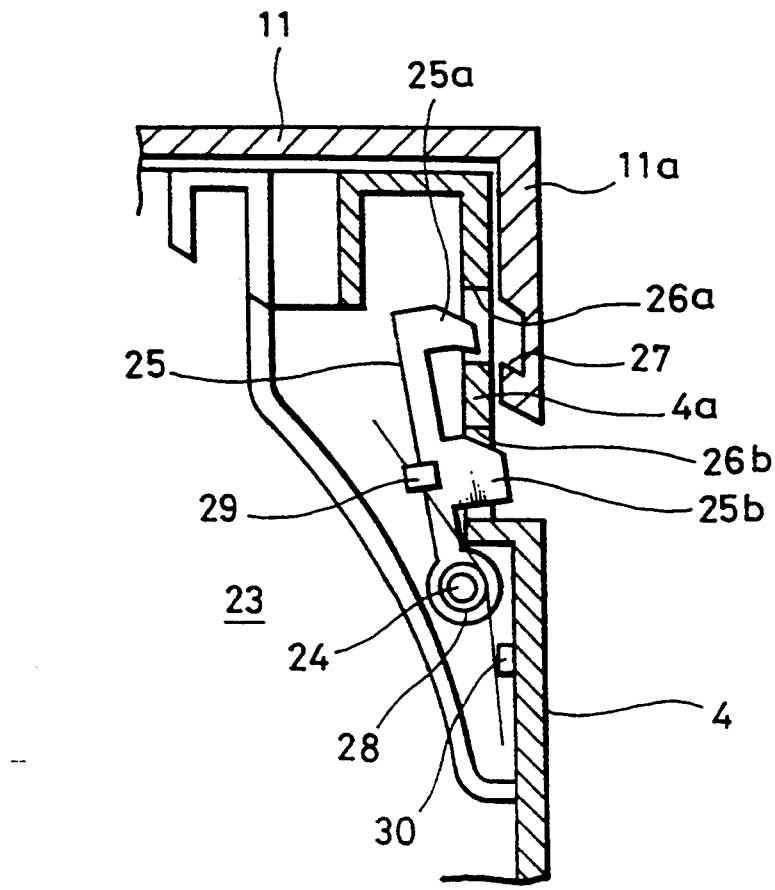
FIG. 5B is a schematic plan view illustrating the guard panel locking mechanism of the conventional tape cassette in which the guard panel is released from the locked state.
Figure 6A:
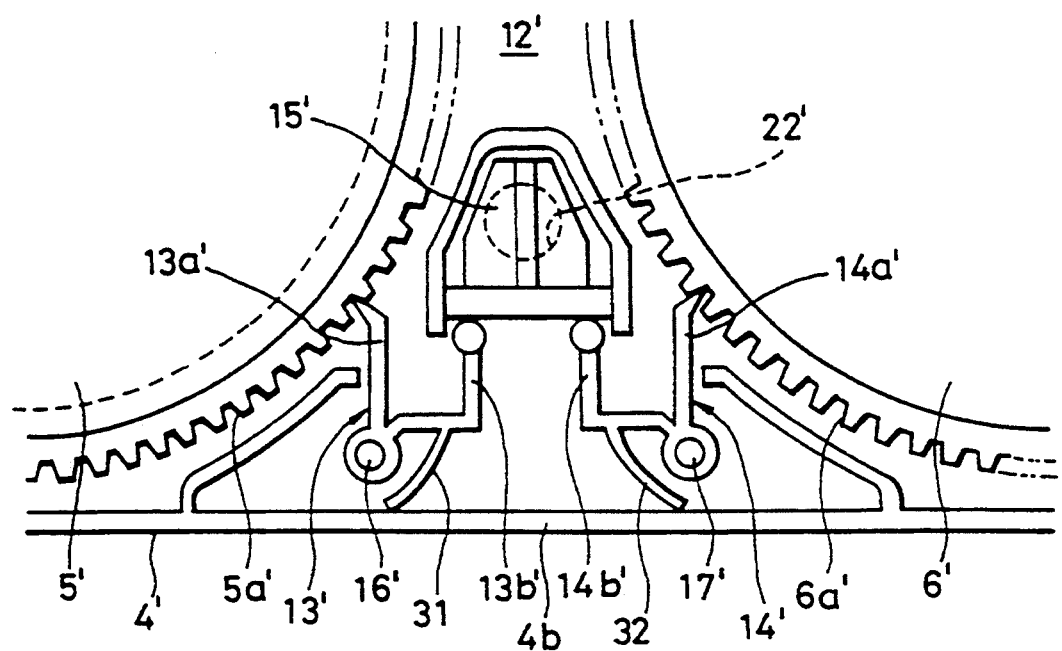
FIG. 6A is a schematic plan view illustrating a reel locking mechanism of a tape cassette according to an embodiment of the present invention in which tape reels are in locked states.
Figure 6B:
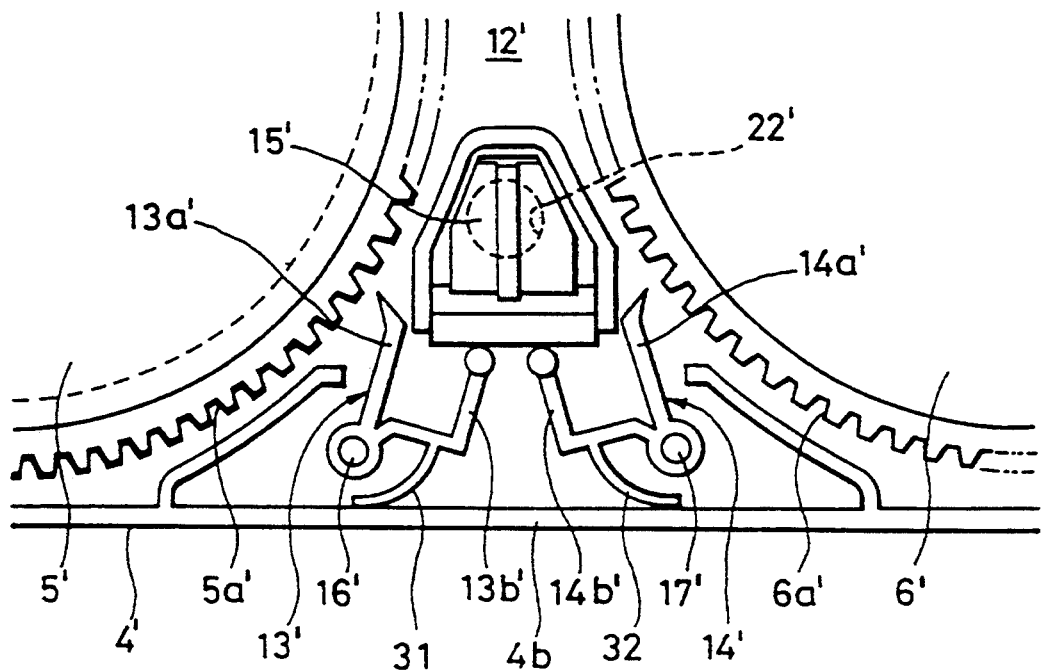
FIG. 6B is a schematic plan view illustrating the reel locking mechanism of the tape cassette according to the embodiment in which the tape reels are released from the locked states.

FIG. 6A and 6B show an embodiment of the reel locking mechanism 12 according to the embodiment. Referring to FIGS. 6A and 6B, the reel locking mechanism 12 comprises reel locking members 13, 14 and spring or elastic portions 31, 32 of strip-like configurations formed together in a united piece. A tip portion of each of the spring portions 31 and 32 abuts on a rear wall 4b of the lower half 4 so that the spring portions 31 and 32 act as springs, respectively. Thus, the reel locking members 13 and 14 are spring-biased by the spring portions 31 and 32 to swing in such directions that the engaging ratchets 13a and 14a thereof engage with the tooth 5a and 6a of the reels 5 and 6, respectively, as shown in FIG. 6A, so that each of the reels 5 and 6 is prevented from rotating. In this case, the conventional torsion coil spring 19 is eliminated.

Figure 7A:
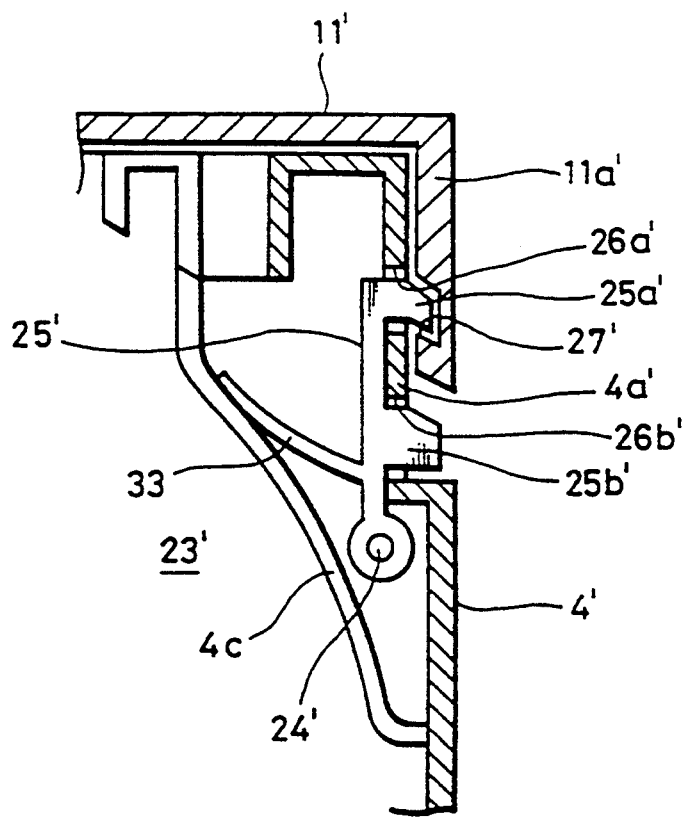
FIG. 7A is a schematic plan view illustrating a guard panel locking mechanism of the tape cassette according to an embodiment in which a guard panel is in a locked state.
Figure 7B:
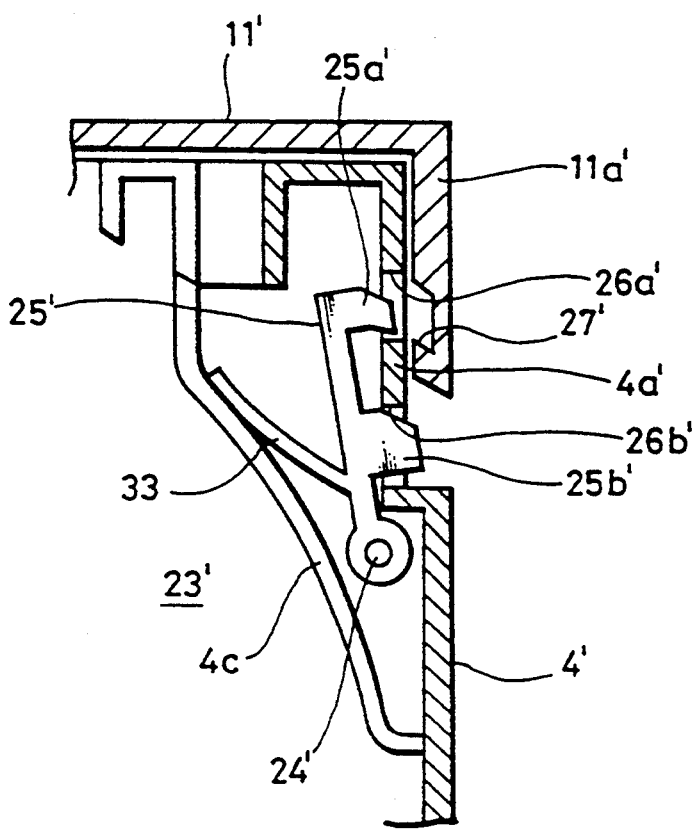
FIG. 7B is a schematic plan view illustrating the guard panel locking mechanism of the tape cassette according to the embodiment in which the guard panel is released from the locked state.

FIGS. 7A and 7B show an embodiment of the guard panel locking mechanism 23 according to the present invention. Referring to FIGS. 7A and 7B, the guard panel locking mechanism 23 is constructed by unitedly forming the guard panel locking member 25 and a spring or elastic portion 33 of a strip-like configuration. A tip portion of the spring portion 33 abuts on a bulkhead or partition wall 4c formed within the lower half 4 so that the spring portion 33 acts as a spring. Thus, the guard panel locking member 25 is spring-biased by the spring portion 33 to swing in such a direction that the engaging ratchet 25a thereof engages with the engaging recess 27 formed on the side panel 11a of the guard panel 11, as shown in FIG. 7A, so that the guard panel 11 is kept in the locked state. In this case, the conventional torsion coil spring 28 is eliminated.

According to the present invention, each of the reel locking members 13, 14 and the guard panel locking member 25 including spring portions 31, 32 and 33, respectively, is made of shape memory resin. The shape memory resin has such a property that it recovers its original configuration when its temperature reaches a predetermined value. The materials of the shape memory resin which have been put to practical use are trans polyisoprene, polynorbornane, styrene-butadiene copolymer, polyurethane or the like. Among these materials, since the polyurethane is capable of arbitrarily setting its shape recovery temperature between −30° C. and +70° C., each of the reel locking members 13, 14 and the guard panel locking member 25 including the spring portions 31, 32 and 33 is molded by the polyurethane and its shape recovery temperature is set at a suitable value, for example, between 20° C. and 30° C.

When the tape cassette 1 having the reel locking members 13, 14 and the guard panel locking member 25 each thus molded by the shape memory resin is mounted and kept in the VTR for a long period of time in a state that the reels 5, 6 and the guard panel 11 are released from the locked state by the reel locking members 13, 14 and the guard panel locking member 25, the spring portions 31, 32 and 33 of the reel locking members 13, 14 and the guard panel locking member 25 are kept to be applied with the creep load under a high temperature in the VTR. Thus, the spring portions 31, 32 and 33 are kept bent for a long period of time and so deformed. However, when the tape cassette 1 is ejected from the VTR, temperature around the reel locking members 13, 14 and the guard panel locking member 25 changes from the high temperature in the VTR to the shape recovery temperature of the shape memory resin, so that each of the spring portions 31, 32 and 33 recovers its original configuration. Accordingly, since the spring portions 31, 32 and 33 are not deformed, the reel locking members 13, 14 and the guard panel locking member 25 are reliably spring-biased by the spring portions 31, 32 and 33 in the directions to the locking states. Thus, when the tape cassette 1 is not in use, each of the reels 5, 6 and the guard panel 11 is constantly locked whereby the tape cassette with high reliability can be provided.

As set out above, according to the present invention, a tape cassette includes a cassette casing which rotatably accommodates tape reels for winding a tape and accommodates a reel locking member for preventing the rotation of the reel when the tape cassette is not used, wherein the reel locking member is unitedly formed with a spring portion for spring-biasing the reel locking member in its locking direction that the reel locking member prevents the rotation of the reel, and wherein the reel locking member is made of shape memory resin. Thus, since the spring portion recovers its original configuration even if the spring portion is deformed due to the creep load applied thereto, the tape reels can be surely prevented from rotating by the reel locking members when the tape cassette is not in use.

Further, a tape cassette includes a guard panel for opening and closing a tape exposing portion provided at a front face of a cassette casing and a guard panel locking member for holding the guard panel in a closed state when the tape cassette is not used, wherein the guard panel locking member is unitedly formed with a spring portion for spring-biasing the guard panel locking member in its locking direction that the guard panel locking member holds the guard panel in the closed state, and wherein the guard panel locking member is made from shape memory resin. Thus, since the spring portion recovers its original configuration even if the spring portion is deformed due to the creep load applied thereto, the guard panel can be held reliably in the closed state by the guard panel locking member when the tape cassette is not in use.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A tape cassette having a cassette casing which rotatably accommodates tape reels for winding a tape and accommodates a reel locking member for preventing rotation of the reels when the tape cassette is not in use, wherein the reel locking member is unitarily formed with a spring portion for spring-biasing the reel locking member in its locking direction whereby the reel locking member prevents rotation of the reels, and wherein the reel locking member is made of shape memory resin which recovers its original configuration at a predetermined temperature.

2. The tape cassette according to claim 1, wherein the predetermined temperature is substantially equal to room temperature.

3. A tape cassette as set forth in claim 1 further including a guard panel for opening and closing a tape exposing portion provided at a front face of said cassette casing, and a guard panel locking member for locking the guard panel in a closed state when the tape cassette is not in use, wherein the guard panel locking member is unitarily formed with a spring portion for spring-biasing the guard panel locking member in its locking direction so that the guard panel locking member holds the guard panel in the closed state, and wherein the guard panel locking member is made of shape memory resin which recovers its original configuration at the predetermined temperature.

4. The tape cassette according to claim 3, wherein the predetermined temperature is substantially equal to room temperature.

5. The tape cassette according to claims 2 or 4, wherein said predetermined temperature is selected in a range of from 20° C. to 30° C.

6. The tape cassette according to claim 3, wherein the spring portion of said guard panel locking member recovers its original configuration when the tape cassette reaches room temperature to thereby spring-bias the guard panel locking member in its locking direction.

7. The tape cassette according to claim 1, wherein the spring portion recovers its original configuration when the tape cassette reaches room temperature to thereby spring-bias the reel locking member in its locking direction.

8. The tape cassette according to claim 1, wherein said shape memory resin is one of transpolyisoprene, polynorbornane, styrene-butadiene copolymer and polyurethane.

9. A tape cassette which includes at least a tape reel for winding a tape, said tape reel being contained within a cassette casing; means for locking the tape reel when the tape cassette is not used, said locking means including a reel locking member formed with a spring portion for spring-biasing the reel locking member in its locking direction so that the reel locking member prevents rotation of the tape reel; a guard panel for opening and closing a tape exposing portion provided at a front face of said cassette casing; a guard panel locking member for locking the guard panel in a closed state when the tape cassette is not used, wherein the guard panel locking member is formed with a spring portion for spring-biasing the guard panel locking member in its locking direction so that the guard panel locking member holds the guard panel in the closed state, wherein at least one of the spring portions of said reel locking member and said guard panel locking member is made from a shape memory resin which recovers its original configuration at a predetermined temperature.

10. The tape cassette as set forth in claim 9 wherein both of the spring portions of said reel locking member and said guard panel locking member are made from a shape memory resin.

* * * * *